United States Patent [19]  [11] 3,919,707
Evans  [45] Nov. 11, 1975

[54] RADAR VIDEO PROCESSING SYSTEM
[75] Inventor: Norol T. Evans, San Pedro, Calif.
[73] Assignee: Hughes Aircraft Company, Culver City, Calif.
[22] Filed: Sept. 5, 1967
[21] Appl. No.: 665,383

[52] U.S. Cl. .................................. 343/5 DP
[51] Int. Cl.² ........................................ G01S 7/44
[58] Field of Search .............. 343/5 R, 5 DP, 12 SB

[56] References Cited
UNITED STATES PATENTS

| | | | |
|---|---|---|---|
| 3,162,852 | 12/1964 | Altovsky et al. | 343/5 X |
| 3,286,258 | 11/1966 | McQueen | 343/5 X |
| 3,353,177 | 11/1967 | Wilmot | 343/5 DP |
| 3,412,397 | 11/1968 | Evans | 343/5 DP |
| 3,503,068 | 3/1970 | Yamauchi | 343/5 DP X |
| 3,579,237 | 5/1971 | Steingart | 343/5 DP X |
| 3,646,588 | 2/1972 | Van Popta | 343/5 DP X |
| 3,680,095 | 7/1972 | Evans | 343/5 DP X |
| 3,836,964 | 9/1974 | Evans | 343/5 DP X |

Primary Examiner—T. H. Tubbesing
Attorney, Agent, or Firm—James K. Haskell; Walter J. Adam; Lawrence V. Link, Jr.

[57] ABSTRACT

A system in which radar video returns are processed by first converting the returns from each range bin into a multibit code. Codes from a 3x3 range bin pattern, from the same range interval, are correlated in real time to provide a target detection signal only when the codes from the center range bin and at least one other range bin are of minimum numerical values. The target detection signals are used to control the selection and temporary storing of codes from selected range bins which are adjacent in azimuth and elevation. The selected codes are then operated upon in accordance with defined subroutines to derive target azimuth and elevation beam splitting signals.

14 Claims, 14 Drawing Figures

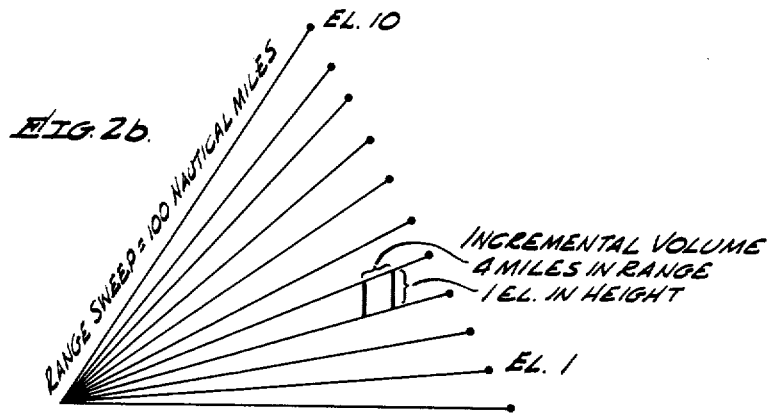
FIG. 2b.
| VIDEO AMPLITUDE CODE | RELATIVE AMPLITUDE OF PEAK VIDEO RETURNS WITH RESPECT TO RMS NOISE |
|---|---|
| 0 0 0 | $X < 3$ db |
| 0 0 1 | $3 \leq X < 6$ db |
| 0 1 0 | $6 \leq X < 9$ db |
| 0 1 1 | $9 \leq X < 12$ db |
| 1 0 0 | $12 \leq X < 18$ db |
| 1 0 1 | $18 \leq X < 27$ db |
| 1 1 0 | $27 \leq X < 39$ db |
| 1 1 1 | $39 \leq X$ |
FIG. 3.
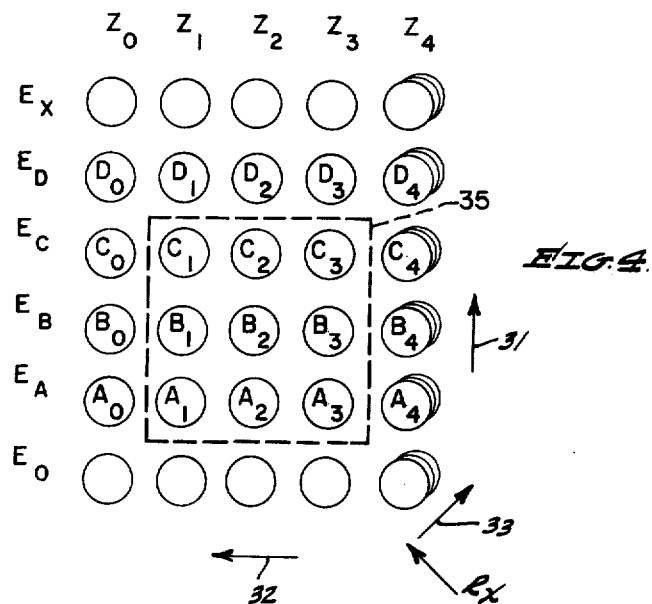
FIG. 4.

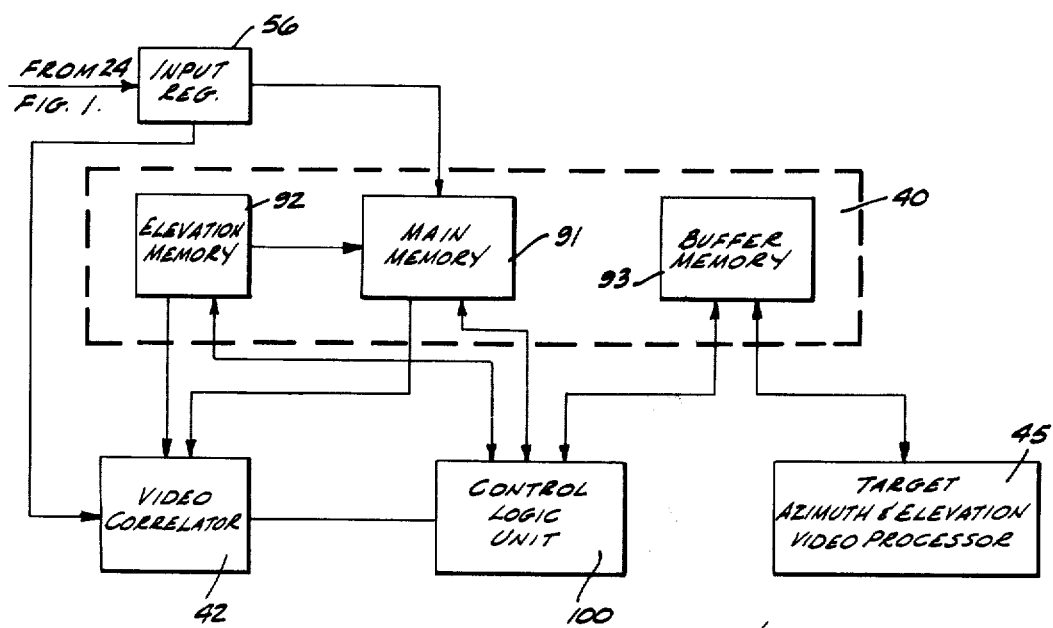

RADAR VIDEO PROCESSING SYSTEM

BACKGROUND OF THE INVENTION

1. Field of the Invention

This invention relates to a radar processing system and, more particularly, to a video processing system to automatically produce target azimuth and elevation information, the system, finding particular application in a pencil beam radar system.

2. Description of the Prior Art

A major problem in automatic detection, acquisition and digital track-while-scan systems is the automatic processing of all the video returns from the surveillance radar. At present, nearly every radar system of any degree of complexity, employs a computer to process the video returns, which are generally digitized to quantized, before being supplied for storage and processing in the computer. Briefly, the video returns from each range interval, also known as a range bin, are digitized to represent the magnitude of the video returns with respect to a selected threshold or skim level. It is the digitized video returns which are processed to determine the presence of meaningful radar tagets.

In an automatic track-while-scan radar system, employing a pencil beam, it has been found that the detection capability greatly increases when employing a beam stacking factor which is greater than one, without a substantial increase in required power. However, with a stack factor of more than one, significant target energy will appear from more than one beam or in more than one range bin. This feature may be utilized to enhance target detection, by integrating or correlating the digitized video which represents target energy, appearing in adjacent range bins.

Briefly, correlation is accomplished by relating the digitized video in adjacent range bins from adjacent range sweeps, all at the same range, and provide a target detection signal, often referred to as a hit, only when the digitized video in particular range bin combinations exceed certain threshold level relationships. However, since a significant target may produce a plurality of hits as the target is scanned by successive range sweeps, it is necessary to interrelate the hits in order to accurately determine the target location, such as its azimuth and elevation positions.

Alternately stated, a need exists for a system for automatically processing or beam splitting the hits in order to derive accurately target azimuth and elevation. These must be derived if the system is to automatically track the target without losing it. At the same time however, it is necessary to be able to automatically distinguish between meaningful targets and other hit-producing bodies, such as clutter.

OBJECTS AND SUMMARY OF THE INVENTION

It is therefore a primary object of the present invention to provide a novel video processing system.

Another object of this invention is to provide a new video processing system, finding particular application in a pencil beam radar receiving system.

A further object is the provision of a video processor in a pencil beam radar receiving system for automatically processing target detection signal to derive accurate target location information.

Still a further object of this invention is to provide a video processor for deriving azimuth and elevation information of a target, providing a plurality of hits.

Yet a further object is to provide an automatic azimuth and elevation beam splitting system to increase the accuracy of target detection.

These and other objects of the invention are achieved by providing a video processor in which a hit is determined on the basis of the video returns of predetermined amplitude relationships in selected combinations of adjacent range bins. Once a hit is determined, the video returns in various related range bins are constantly correlated and compared to select the range bins whose video returns are to be used to determine the azimuth and elevation of the target. Since large targets may produce significant video returns in several adjacent range bins in azimuth and elevation for the same range in adjacent range sweeps, the processor includes means for storing the amplitudes of the video returns of a sufficient number of range bins in order to determine target azimuth and elevation of the largest expected targets. The processor further includes circuitry to prevent large but meaningless targets, such as clutter from producing signals representative of a meaningful target.

The novel features that are considered characteristic of this invention are set forth with particularity in the appended claims. The invention will best be understood from the following description when read in conjunction with the accompanying drawings.

BRIEF DESCRIPTION OF THE DRAWINGS

FIGS. 2a and 2b are diagrams useful in explaining the radar scanning pattern associated with the present invention;

FIG. 3 is a chart in which numerical values of a three bit codes are defined in terms of peak video returns with respect to RMS noise;

FIG. 4 is a diagram of adjacent range bins at a given interval;

FIG. 5 is a chart of acceptable hit patterns, assumed to provide target detection signals;

FIG. 6 is a diagram of adjacent range bins with specific code numbers which are used to explain the invention;

FIG. 7, 8 and 9 are block diagrams useful in explaining one embodiment of the invention;

FIGS. 10 and 11 are block diagrams useful in explaining a second embodiment of the invention; and FIGS. 12 and 13 are word formats in two memories which form part of the embodiment diagrammed in FIGS. 10 and 11.

DESCRIPTION OF THE PREFERRED EMBODIMENTS

Figure 1:
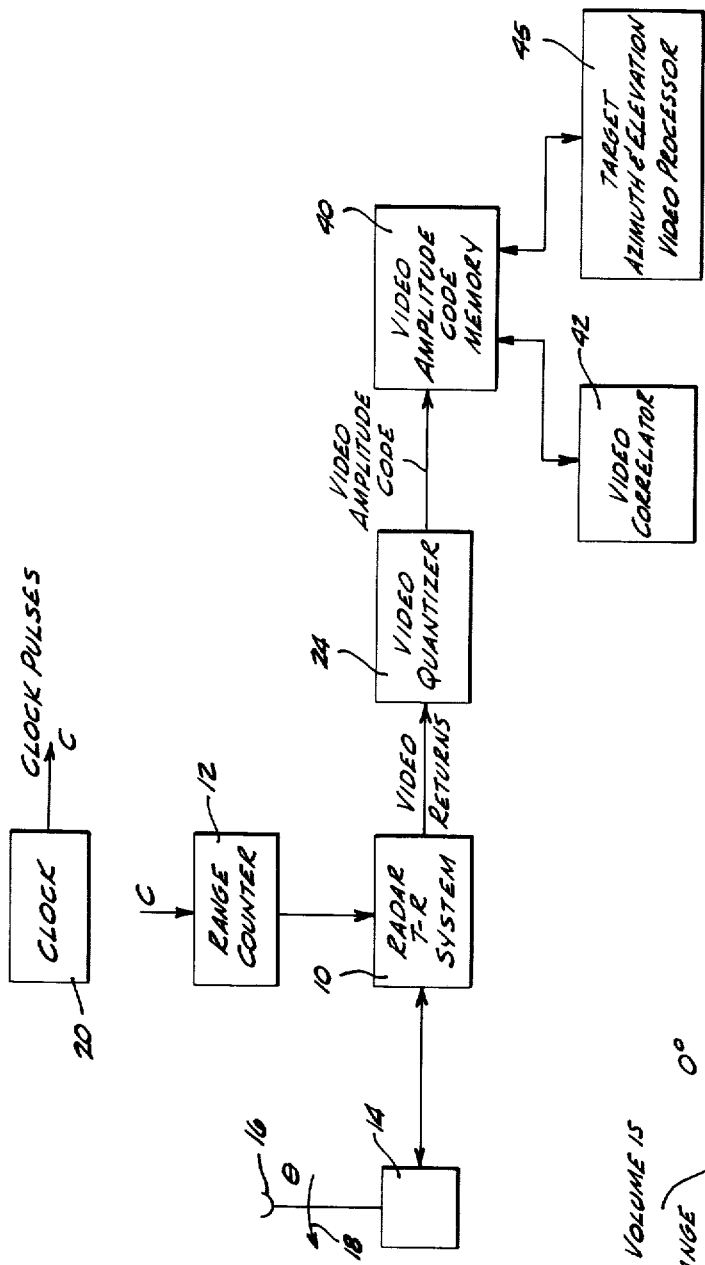
FIG. 1 is an overall block diagram of the system of the present invention.
Figure 2A:
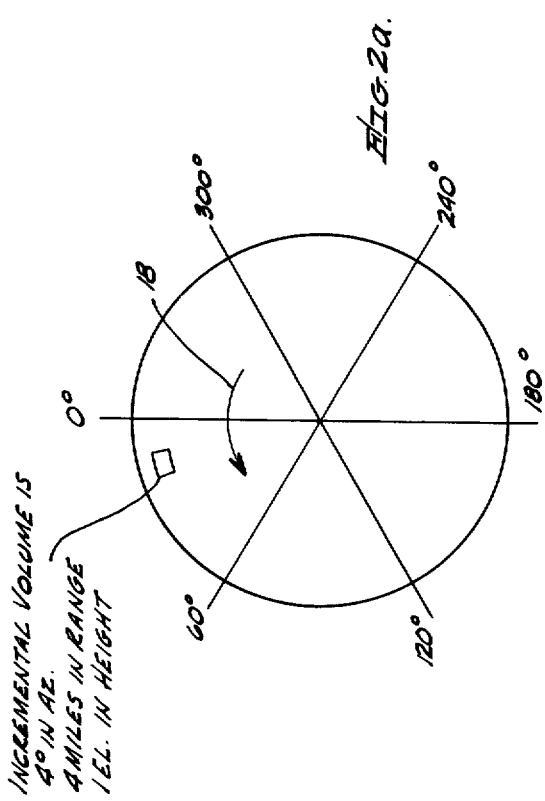

Reference is now made to FIG. 1 which is a general block diagram of a radar receiving system of the type in which the video process or the present invention may be incorporated. Therein is shown a radar transmitter-receiver (T-R) system 10 which, in synchronism with a master trigger signal, derived from a range counter 12, applies pulses of energy to an antenna control system 14 which includes a rotating surveillance antenna 16. In the following description, it is assumed that antenna rotates in a horizontal plane in a counter clockwise direction, as indicated by arrow 18 in FIGS. 1 and 2a. Each complete revolution represents a complete radar scan. At each of a plurality of azimuth positions, only six of which are shown in FIG. 2a, pulses of energy are sequentially transmitted into space from the antenna 16 at a plurality of elevations. These pulses and the directions in which they are transmitted and from which reflected signals are received may be thought of as range sweeps.

For explanatory purposes, it is assumed that only ten range sweeps designated EL1 to EL10 in FIG. 2b are transmitted at each azimuth position. The spacing between adjacent azimuth positions is assumed to equal a selected angular spacing, such as 1°. In such a scanning arrangement, during a complete radar scan, pulses or range sweeps are transmitted at ten elevations in each of 360 azimuth positions.

The range counter 12 (FIG. 1) is assumed to define a plurality of range bins, or intervals in space along each range sweep, from which reflected energy may be received by the antenna 16. Let each range sweep contain 400 range bins of 3.09 microseconds ($\mu s$) each and that the transmitted energy pulse width is approximately of the same length. Since each range bin corresponds to 500 yards range, the length of each range sweep is 100 nautical miles. Pulses, necessary to control range counter 12, as well as the various logic circuits, such as gates and flip-flops to be described hereafter in detail, may be provided by a clock 20. The output pulses of clock 20 hereafter referred to as clock pulses are designated by C.

The energy, reflected to the antenna 16 from radar targets which may include meaningful targets, such as aircrafts, and undesired targets, such as clutter, is supplied to system 10. Therein, video returns from each range bin are developed at video frequency by mixing and envelope detecting techniques, which are well known in the art. The output of system 10 during each system time period thus represents the video returns from a different range bin.

As is appreciated by those familiar with the art, in advanced track-while-scan radar systems, such video returns are generally first quantized before they are processed or correlated to determine whether they represent meaningful targets to be tracked. In FIG. 1, the video returns from system 10 are shown supplied to a video quantizer 24. The function of the quantizer 24 is to convert the video returns from each range bin into a multibit amplitude code. The value of the code, i.e. the number represented by it is a function of the relative amplitude of the peak of the video returns from the range bin with respect to a preselected threshold or skim level, such as RMS noise. A typical set of three bit amplitude codes used to designate the relative peak amplitudes of the video returns, generally designated by X, with respect to RMS noise is diagrammed in chart form in FIG. 3 to which reference is made herein.

As seen therefrom, when the peak of the video returns from a range bin is less than 3 db above the threshold level, the video returns are represented by a three bit amplitude code which comprises a three bit binary number of a value zero, i.e. 000 as seen in the top row of FIG. 3. On the other hand, when the peak video return X is equal to or greater than 39 db above the threshold level, three bit amplitude code forming the number seven (111) is produced in the quantizer 24. Other relative magnitudes of the peak video returns with respect to the threshold level are designated by three bit binary numbers 1 through 6, as shown in rows 2 through 7 of the figure. Hereafter, for simplicity, the three bit amplitude codes may also be referred to as code hits. Thus, an amplitude code representing the number seven may be referred to as a 7 code hit while the amplitude code represented by 000 may be referred to as the 0 code hit.

The sequence of code hits produced by quantizer 24 for a beam pattern in a radar system in which range sweeps are sequentially transmitted in elevation as the radar scans in azimuth, may best be explained in conjunction with FIG. 4 to which reference is made herein. Therein arrows 31, 32 and 33, represent the scan direction in elevation, azimuth and range, respectively. Each of the circles represents a different range bin. Columns $Z_4$ through $Z_0$ represent successive azimuth scan positions, while rows $E_o$ and $E_x$ represent different elevation positions in each of the azimuth locations. In the foregoing example, with ten elevations, $x$ is equal to 10, with the lowest elevation being represented by $E_0$. At each azimuth and elevation position, code hits are successively produced for 400 successive range bins, represented by successively position circles along arrow 33. All the front circles diagrammed in FIG. 4 represent range bins of the same range interval, which is designated in the figure by $R_x$.

Thus, it should be appreciated that at each azimuth poistion 400 code hits are produced at each elevation for a total of 4,000 code hits at each of the azimuth positions, scuch as $Z_4$.

In the processing of video information, to detect meaningful targets, it has been found that target detection may greatly be enhanced by integrating or correlating the code hits appearing in range bins in adjacent range sweeps, both in azimuth and elevation. Thus for example, detection of a target at the range bin, designated in FIG. 4 by $B_2$, at range interval $R_x$ at azimuth $Z_2$ and elevation $E_b$ may better be determined by relating the code hit in such range bin with the code hits in the range bins $B_1$ and $B_3$ at the same elevation, i.e. $E_b$, as well as with the code hits in range bins $A_1$, $A_2$ and $A_3$, at elevation $E_a$ and the code hits in range bins $C_1$, $C_2$ and $C_3$ at elevation $E_c$, and in azimuth positions $Z_1$, $Z_2$ and $Z_3$ respectively.

Briefly stated, it has been found, that when certain basic energy patterns, represented by the code hits are present in adjacent range bins, related to the same range interval ($R_x$), the probability of the presence of a target in such a range interval, even in the presence of noise and external interference is greatly enhanced. Three such basic detection patterns are listed below:

1. Two hits, at least 9 db above a given threshold level in adjacent azimuth or elevation positions. That is two adjacent 3 code hits.

2. Three hits with at least 9 db, 6 db and 3 db amplitudes above the threshold level. That is, one 3 code hit, one 2 code hit and one 1 code hit.

3. Four hits, three of them at least 6 db and one with at least 3 db amplitudes of the threshold level. That is, three 2 code hits and one 1 code hit.

Figures 5, 6:
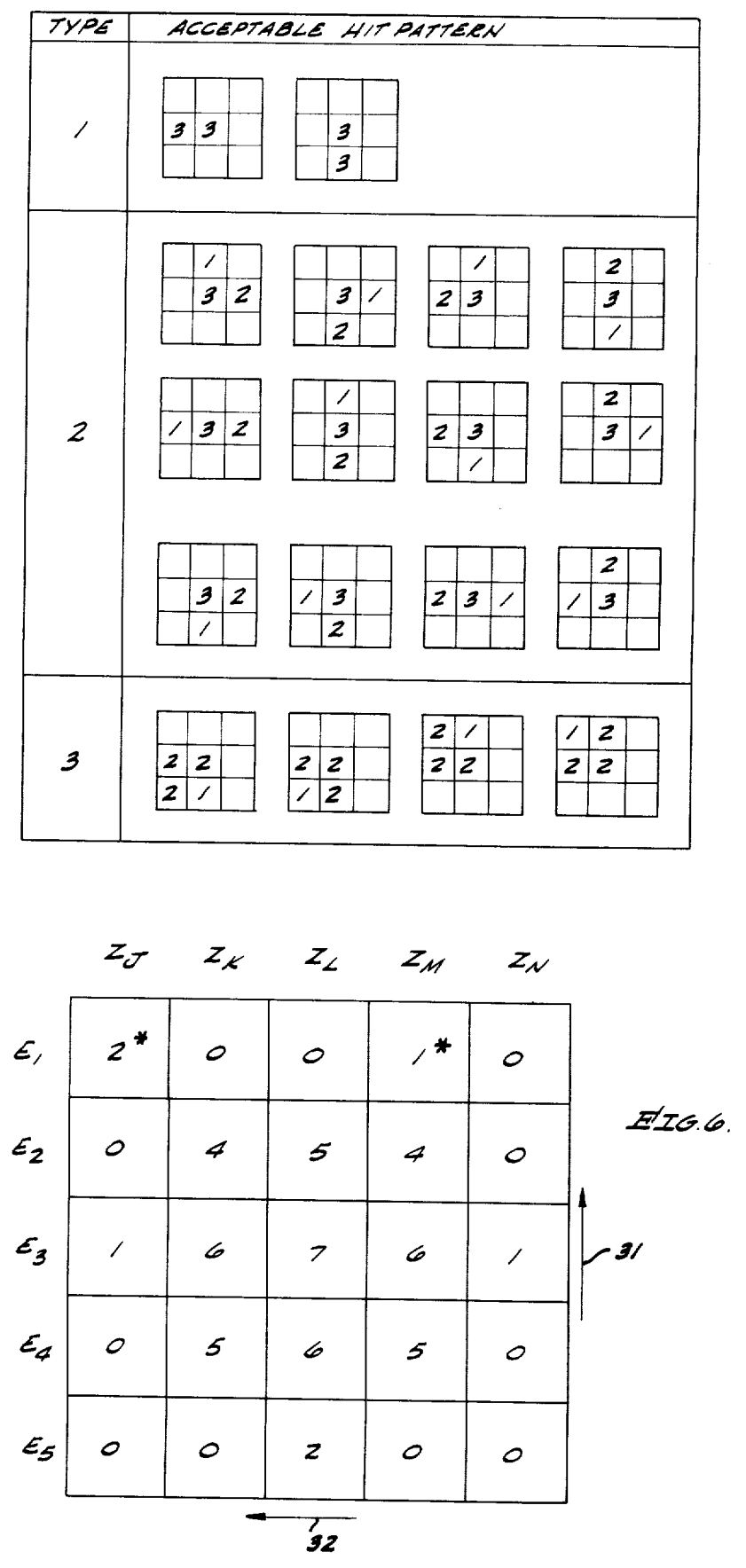

The various acceptable hit patterns for each of the three types are diagrammed in FIG. 5 to which reference is made herein. The numbers 1, 2 and 3 designate a 1 code hit, 2 code hit and 3 code hit, respectively. Thus, in accordance with such teachings, before a target is assumed to be detected at any range bin, its code hit and that of eight adjacent bins, surrounding it, must be available to form a 3×3 range bin matrix. In FIG. 4 for example, the detection of a target with respect to range bin $B_2$ is determined on the basis of the code hits in the nine range bins surrounded by dashed line 35 which may be thought of as defining a code hit window.

It should be appreciated, however, that since the code hit for each range bin is provided by the video quantizer at a different time, means must be provided to avail the code hits of the nine range bins in time coincidence for correlation to determine whether they form any of the patterns shown in FIG. 5.

In U.S. Pat. No. 3,412,397 which issued Nov. 19, 1968 on application Ser. No. 613,152 Feb. 1, 1967 by the inventor of the present application and assigned to the assignee of the present application, such means and means for relating the code hits in the nine range bins of the window are disclosed and claimed. Briefly, for a radar scanning pattern, moving from right to left in azimuth and from bottom to top in elevation, when the code hit for the range bin at the top left hand corner of the matrix, such as $C_1$ is received in real time, the code hits of the other eight range bins are read out from two interrelated memories operating in real time. As a result, the code hits of all nine range bins are available coincidently in time.

In such an arrangement, for the nine range bins diagrammed in FIG. 4 within window 35, (FIG. 4) when the code hit of $C_1$ is provided by the video correlator, a word, out of a main memory containing the codes of range bins $C_2$, $C_3$, $B_2$, $B_3$, $A_2$, and $A_3$, is read out. At the same time, the code hits for bins $B_1$ and $A_1$ are read out from a word in another memory, therein referred to as the elevation memory. Then, after the correlation is performed for the nine range bins to determine whether their codes fit any of the hit patterns, the code hits read into the word in the main memory consist of the code hits of bins $C_1$, $C_2$, $B_1$, $B_2$, $A_1$ and $A_2$, while the code hits written into the word from the elevation memory are those for range bins $C_1$, and $B_1$.

The main memory consists of 4,000 words, each associated with a different one of the range bins in any azimuth position, while the elevation memory contains only 400 words which are read out sequentially during each one of the ten range sweeps at each azimuth position, i.e. during each elevation. Then, 400 range bins later, when the code hit of range bin $D_1$ is received in real time, the word in the elevation memory containing the code hits of bins $C_1$ and $B_1$ is read out, as well as a word from the main memory containing the code hits of bins $D_2$, $D_3$, $C_2$, $C_3$, $B_2$ and $B_3$. Similarly, the word in the main memory in which the code hits of bins $C_1$, $C_2$, $B_1$, $B_2$, $A_1$ and $A_2$ have been stored, is read out when one azimuth position later, i.e. at azimuth position $Z_0$ and elevation $E_c$, when in real time the code hit of the range bin $C_0$ is received. At the same time the elevation memory produces a word containing the code hits of bins $B_0$ and $A_0$ to correlate the code hits of the nine range bins centered about bin $B_1$.

Such a target detection technique has been found to be quite useful in reducing the number of meaningless targets which are detected. That is it eliminates the detection of targets which do not produce any of the acceptable hit patterns. Only targets worth tracking produce such patterns. The reduction of detection of meaningless targets is particularly desirable, since it reduces the size of the memory and other processing circuitry which is required. Also, it avoids the danger of tracking undesired targets over those which merit tracking.

From experience, as well as from theoretical analysis, it has been found that detection based on the correlation of the code hits in only a 9×9 range bin matrix as herebefore described, is mostly useful for the detection of very small targets. The latter type produce meaningful code hits in not more than three adjacent range bins and therefore the 3×3 matrix may be deemed sufficient. However, medium size targets may produce code hits in four adjacent range bins, while large targets may even produce meaningful hits in five positions or range bins in each of the directions, i.e. elevation and azimuth. Thus, such targets may during the radar scanning pattern of moving in azimuth as well as in a plurality in elevations at each azimuth position, provide detections at several points, which unless properly related will produce several different azimuth and elevation positions for the target, and thereby complicate the tracking thereof, as well as the tracking accuracy.

The present invention is particularly directed to a system for automatically detecting the targets as well as to interrelate adjacent target detections to provide the accurate target azimuth and elevation positions. The latter aspect of the system of the present invention may be thought of as means for automatically beam splitting the azimuth and elevation signals produced by the detection of a relatively large target in order to more precisely locate the target's azimuth and elevation.

The system of the present invention, may be described briefly in conjunction with FIG. 1 to which reference is again made. In accordance with this invention, the video amplitude code from quantizer 24, produced in real time, for each range bin is transferred to a video amplitude code memory 40 which may include one or more memories, operating in synchronism. For simplicity memory 40 will hereafter also be referred to as the code memory. As the code hits for adjacent range bins both in azimuth and elevation are accumulated in the memory 40 for each range interval at each azimuth and elevation position, the code hits in adjacent range bins, such as the 3×3 range bin matrix hereinbefore described are supplied to a video correlator 42.

The function of correlator 42 is to relate and determine whether such code hits form any one of the acceptable hit patterns (FIG. 4). In case they do, a target detection signal is supplied to the memory 40 to be stored in a location therein which is related to the location where the various code hits are stored. Once detection is determined and its location, i.e. both azimuth and elevation ascertained in real time, the actual code hits in a selected row of range bins, i.e. code hits in range bins in adjacent azimuth positions, as well as the code hits in a selected column, representing the hits in range bins in a single azimuth but in different elevations are interrelated to precisely determine the azimuth and elevation positions of the target, which as hereinbefore stated may produce target detection in more than one range bin. These code hits are processed in a target azimuth and elevation video processor 45.

This aspect of the invention may better be explained by referring to FIG. 6 in which an exemplary code hit diagram produced in five adjacent azimuth positions and five adjacent elevation positions is diagrammed. The number in each square represents the amplitude or numerical value of the code hit. The adjacent azimuth positions are designated $Z_J$, $Z_K$, $Z_L$, $Z_M$ and $Z_N$, while the elevation positions are designated $E_1$, $E_2$, $E_3$, $E_4$ and $E_5$. The radar scanning directions are designated by arrows 31 and 32, respectively. Hereafter, for simplicity each range bin may be referred to and designated by the subscripts of its azimuth and elevation. For example, the range bin at azimuth $Z_L$ and elevation $E_3$ may be referred to as range bin L3, etc. The diagram in FIG. 6 is exemplary of code hits which may be produced by a relatively large target centered at range bin L3.

From the foregoing description, it should be appreciated that whenever the nine range bins are centered about any one of the bins M4, M3, M2, L4, L3, L2, K4, K3 and K2, an acceptable hit pattern as outlined in FIG. 5 is produced and a target detection signal is derived. However, in order to accurately determine the azimuth and elevation of a large target producing these various detection signals, the code hits are so interrelated and operated upon to select a particular row of code hits for azimuth beam splitting, and a particular column of code hits for elevation beam splitting so that the azimuth and elevation respectively of the target can be accurately derived.

In accordance with the teachings of this invention, in addition to determining target detection on the basis of a 3×3 range bin matrix, as hereinbefore described, as the code hits are received, in real time, they are compared along each column to determine the row with the largest code hit as well as the column with the largest code hit. Thus for example, with a radar scanning pattern from right to left in azimuth and from top to bottom in elevation, as the code hits in azimuth position $Z_M$ are received, the code hits are compared. And, from the example diagrammed in FIG. 6, it is apparent that by comparing the code hits in adjacent range bins at azimuth position $Z_M$ the presence of the largest, i.e. a 6 code hit in elevation $E_3$ will be sensed and therefore this elevation will be selected as one about which azimuth beam splitting will be performed.

Similarly, when code hits are received in real time at azimuth position $Z_K$, the code hit at azimuth $Z_L$, elevation $E_3$ is compared with the code hits from range bins at azimuth positions on either side thereof, i.e. $Z_K$ and $Z_M$. For the example diagrammed in FIG. 6, the code hit 7 at azimuth position $Z_L$, elevation position $E_3$ is larger than the 6 code hits on either side thereof. Consequently the code hits in the column representing the azimuth position $Z_L$ will be selected for elevation beam splitting. The number of code hits utilized in each row or column for beam splitting, will of course depend on the expected number of meaningful hits from the largest target to be tracked. In the present example, it is assumed that the largest target will produce meaningful code hits in five adjacent positions, and therefore once a determination is made about which row and column beam splitting is to be performed, only the code hits in five adjacent range bins are utilized.

The actual processing of the code hits in five adjacent range bins, such as for example, the code hits in column $Z_L$ used for elevation beam splitting are performed by the target azimuth and elevation video processor 45 (FIG. 1) in accordance with a fixed sequence of steps, known in the computer art as a subroutine. The processor 45 may in practice comprise a general purpose (GP) computer which performs various subroutines, including the subroutines necessary for azimuth and elevation beam splitting.

A subroutine which has been found to be quite useful for elevation beam splitting based on code hits from five or less adjacent range bins is listed hereafter as a sequence of 36 subroutine steps.

PROGRAM STEP OPERATION

1. Compare 2 to 3. Yes, if 2>3 go to step 29. If 2<3 go to step 16. If 2=3 go to step 2.

2. Subtract 4 − 1.
3. Test sign of difference from last previous step. If plus or zero go to step 4. If minus go to step 11.
4. If difference is zero, go to step 5. If difference is plus, go to step 6.
5. Use position 3 + $\Delta EL/2$ and transfer to step 36.
6. Difference = 1. Yes, go to step 7. No, go to step 8.
7. Use position 3 + ⅜ $\Delta EL$ and transfer to step 36.
8. Difference = 2. yes, go to step 9. No, go to step 10.
9. Use position 3 + ¼ $\Delta EL$ and transfer to step 36.
10. Use position 3 + ⅛ $\Delta EL$ and transfer to step 36.
11. Difference = 1. Yes go to step 12. No, go to step 13.
12. Use position 3 + ⅝ $\Delta EL$ and transfer to step 36.
13. Difference = 2. Yes, go to step 14. No, go to step 15.
14. Use position 3 + ¾ $\Delta EL$ and transfer to step 36.
15. Use position 3 + ⅞ $\Delta EL$ and transfer to step 36.
16. Compare 3 to 4. If 3 ≥ 4, go to step 17. If 3 ≤ 4, to to step 19.
17. Subtract 5 − 2.
18. Transfer to step 3 but substitute elevation position 4 for 3 at each completion 1 e.g. in step 5 use 4+ $\Delta EL/2$.
19. Subtract 4 − 3.
20. Test sign of difference from last previous step. If plus or zero, go to step 21. If minus, go to step 27.
21. Subtract 5 − 3.
22. Test sign of differences from last previous step. If plus or zero, go to step 23. If minus, go to step 26.
23. If difference is zero, go to step 24. If difference is plus, go to step 25.
24. Use position 4 and transfer to step 36.
25. Use position 4 − difference $\Delta EL/8$ and transfer to step 36.
26. Use position 4 + difference $\Delta EL/8$ and transfer to step 36.
27. Subtract 4 − 2.
28. Transfer to step 22 but substitute azimuth position 3 for 4 at each completion.
29. Compare 3 and 4. If 3 = 4 go to step 30. If 3 > 4 go to 3 cannot be < 4.
30. Subtract 5 - 1.
31. Test sign of difference from last previous step. If plus or zero, go to step 32. If minus, go to step 35.
32. If difference is zero Yes, to to step 33. If difference is plus, go to step 34.
33. Use position 3 and transfer to step 36.
34. Use position 3 − difference $\Delta EL/8$ and transfer to step 36.
35. Use position 3 + difference $\Delta EL/8$ and transfer to step 36.
36. End of subroutine. Transfer back to executive routine.

Therein the term $\Delta EL$ refers to the difference between elevation positions of the scanning antenna 16 in real time when detection is determined about a 3×3 range bin matrix in which the amplitude code received in real time is in the top left hand corner of the 3×3 matrix. Thus, in the code hit pattern of FIG. 6, $\Delta EL$ represents the difference in the antenna position when code hits for range bins L3 and L2 are received. This is true since the video in range bin L3 is the code hit received in real time when detection is determined about the range bin M4, and the code hit in bin L2 is the video received in real time when detection is determined about range bin M3.

A similar 36-step subroutine is included for azimuth beam splitting. The latter subroutine is identical with that for elevation beam splitting except that instead of operating on the code hits in elevations $E_1$ through $E_5$ the code hits in a single row, representing adjacent azimuth positions $Z_J$ through $Z_N$ are operated upon. Also, instead of $\Delta EL$, a $\Delta AZ$ is supplied. This $\Delta AZ$ term represents the difference in the azimuth positions of the antenna in real time when target detections are produced for any of the range bins. In the example, diagrammed in FIG. 6, $\Delta AZ$ will represent the difference in azimuth position between $Z_L$ and $Z_K$. $Z_L$ represents the azimuth position of the antenna in real time when the code hit for bin L3 is received and target detection is produced for range bin M4, while $Z_K$ represents the azimuth position of range bin K3 whose code hit (6) is utilized in the 3×3 range bin matrix to provide a target detection signal about range bin L4.

The teachings of the present invention can thus be summarized as consisting of a system in which code hits from adjacent range bins in azimuth and elevations are stored in discrete location in the memory such as memory 40 (FIG. 1) and the code hits in related range bins such as the 3×3 matrix correlated in a video correlator (42). The correlation may result in the production of a target detection signal when the code hits are at least equal to certain numerical values and in any one of a plurality of predetermined patterns, such as those diagrammed in FIG. 5.

In addition to providing target detection signals which may be supplied to a utilization device such as a target display apparatus, the numerical values of amplitudes of the code hits in adjacent range bins in azimuth and in adjacent range bins in elevations are compared to select the row of range bins and column of range bins about which azimuth beam splitting and elevation beam splitting respectively, is to be performed. In the example diagrammed in FIG. 6, the codes in the range bin in elevation $E_3$ are utilized for azimuth beam splitting while the codes in the range bins in azimuth $Z_L$ are utilized for elevation beam splitting. The beam splitting is performed by a processor (45) which operates in accordance with the subroutines hereinbefore outlined.

Thus, even though target detection signals are supplied by the correlation of a 3×3 matrix, since relatively large targets may produce meaningful code hits in as many as five adjacent range bins, the actual azimuth and elevation position of the target is determined more accurately by utilizing the beam splitting technique.

It should be appreciated to those familiar with the art of processing video returns in advanced radar systems, such as those employed to track targets while scanning, known as track-while-scan systems, as well as to those familiar with the computer art, that different information storage, correlation, and processing techniques may be employed to implement the teachings hereinbefore disclosed. That is, different memory arrangements may be employed in the implementation of memory 40 to provide, in time coincidence, the various code hits in as many as five adjacent range bins both in elevation and azimuth for beam splitting.

Similarly, various logic circuitry arrangements may be employed in the implementation of video correlator 42 to correlate video from nine adjacent range bins forming a 3×3 matrix in order to determine whether the bins form any of the patterns shown in FIG. 5. Also, the processing of the code hits in as many as five adjacent range bins, assumed to be performed by processor 45, may be implemented by a special purpose processor or by a general purpose computer, programmed to perform the hereinbefore listed subroutines, as part of its overall mode of operation.

Figure 7:
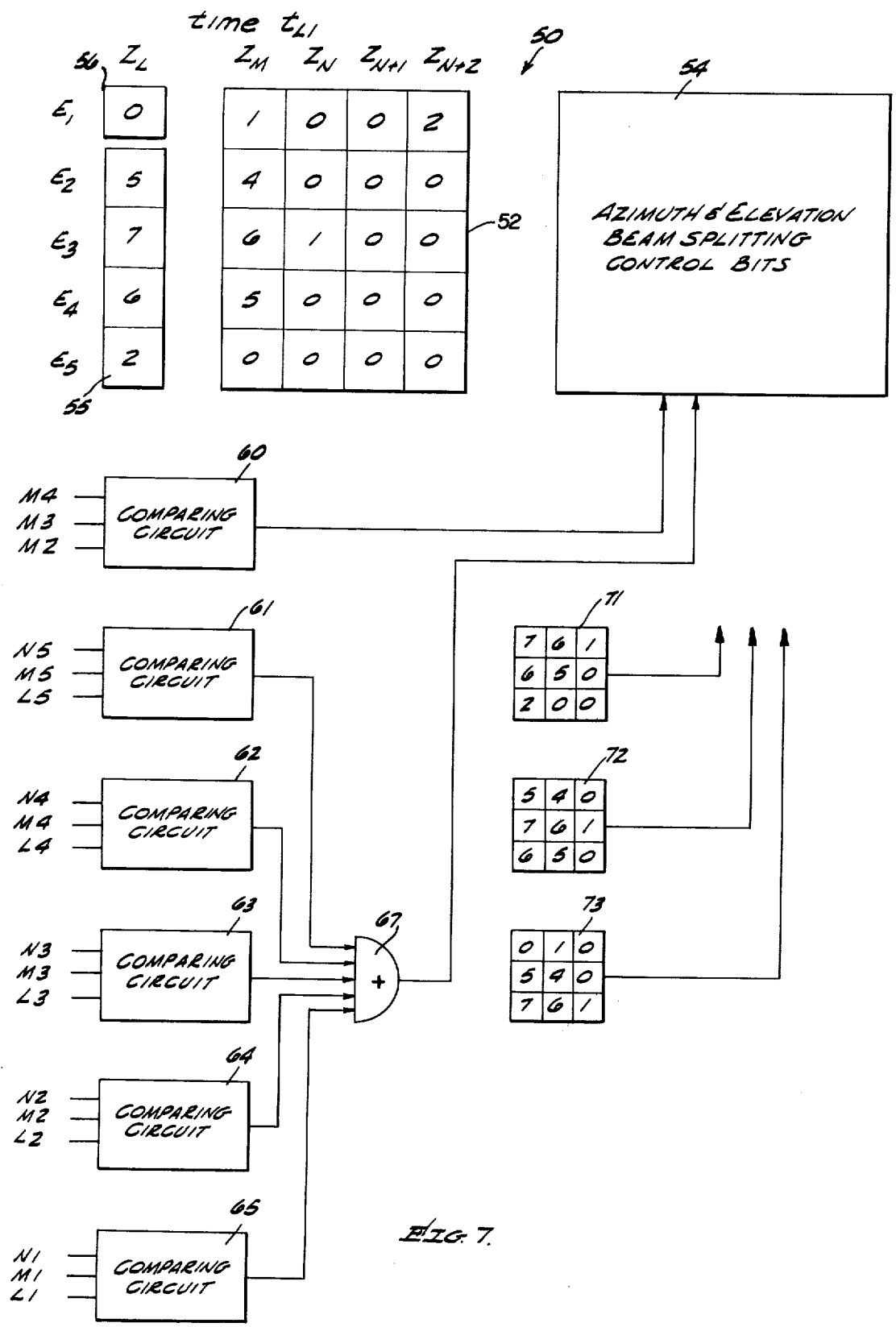

One example of a simplified arrangement of the memory 40 and correlator 42 which may be utilized to practice the teachings hereinbefore described, is diagrammed in simplified block form in FIG. 7 to which reference is made herein. Therein, it is assumed that the memory 40 consists of a main memory 50, having a storage word for each one of the 4,000 range bins at each azimuth position. Each word has a bit storage capacity for storing the code hits of twenty adjacent range bins in azimuth and elevation designated by numeral 52, as well as additional azimuth and elevation beam splitting control bits 54. Also, memory 40 includes an elevation memory 55, containing 400 words, each with a bit storage capacity of four code hits. The video amplitude code from quantizer 24 (FIG. 1) is assumed to be supplied to an input register 56.

The arrangement diagrammed in FIG. 7 is assumed to represent a time $t_{L1}$ the code hit of a range bin L1, of the particular range interval under consideration, is received in real time. At the same time, main memory 50 and elevation memory 55 are assumed to read out the code hits, stored in words therein, associated with the particular range bin. These are read into read registers, which have been purposely deleted from FIG. 7 in order to simplify the diagram.

In the diagrammed arrangement, it is seen that the word from main memory 50 already contains the code hits received during the radar scanning at azimuth positions $Z_N$ and $Z_M$. At the diagrammed time, the code hits from range bins M4, M3 and M2 which are 5, 6 and 4 respectively are supplied to a comparing circuit 60. Its function is to provide a signal to be stored among the control bits 54 only when the code hit from M3 is greater than the code hit from each of range bins M4 and M2. This indicates that the code hits in the center row ($E_3$) should be used for azimuth beam splitting. However, which five code hits in the row are to be selected has to be determined only after a determination is made which column of code hits are to be used for elevation beam splitting. This is accomplished by comparing each of the code hits in azimuth position $Z_M$ with the code hits in adjacent range bins in the same elevation.

The actual implementation of such comparisons is performed by incorporating five comparing circuits designated 61 through 65 respectively, each one supplied with code hits in three adjacent azimuth positions in the same elevation. The outputs of the five comparing circuits (61-65) are ORed by an OR gate 67. Its output is true only when the code hit of the center input to any of the comparing circuits is greater than the code hit supplied to either of the other two inputs thereof. From the diagrammed arrangement, it should be appreciated that at the diagrammed time, comparing circuit 60 will provide a true output, since the code hit from M3, i.e. 6, is greater than the code hits 4 or 5 from range bins M4 and M2 respectively. Thus, it will indicate that azimuth beam splitting should be performed by using the code hits in the center row 3. However, since none of the comparing circuits 61 through 65 provides a true output, the output of OR gate 67 will be false.

While the comparing circuits 60 through 65 perform the comparisons between the three code hits supplied to each one of them, selected ones of the code hits which are read out from memories 50 and 55, are supplied to a plurality of video correlators, diagrammatically represented in FIG. 7 and designated by numerals 71, 72 and 73 respectively. These correlators are assumed to form part of video correlator 42 which is diagrammed in FIG. 1. Briefly, each of the correlators receives code hits from a 3×3 range bin matrix to determine whether any of the hit patterns, shown in FIG. 5 is formed by the adjacent range bins.

As seen from FIG. 7, at time $t_{L1}$, correlator 71 is supplied with the code hits in the range bin in azimuth positions $Z_L$, $Z_M$ and $Z_N$, at elevations $E_3$, $E_4$ and $E_5$. Similarly, correlators 72 and 73 are supplied with the code hits in the same three azimuth positions but from elevations $E_2$, $E_3$ and $E_4$ and $E_1$, $E_2$ and $E_3$, respectively.

By comparing the code hits in each of the three video correlators 71, 72 and 73 and the hit patterns shown in FIG. 5, it should be appreciated that a target detection signal is supplied by each one of them to be stored among the control bits 54 to indicate a target detection signal. Furthermore, it should be pointed out that with a scanning pattern from right to left in azimuth and from bottom to top in elevation as represented by arrows 32 and 31 in FIG. 6, the target detection signal from 71 represents the earliest target detection, while the signal from correlator 72 represents a subsequent target detection in the same azimuth position. Due to the target detection signal from correlator 71, the azimuth and elevation of the antenna when the seven code hits at the top lefthand corner of the 3×3 matrix is received is recorded. That is, azimuth position $Z_L$ and elevation $E_3$ are recorded among the control bits 54. Also, due to the target detection signal from correlator 72, the elevation $E_2$ representing the elevation of the range bin from which the five code hits is received, is also recorded. Elevations $E_3$ and $E_2$ are utilized to derive the term $\Delta EL$.

Before rewriting the bits 52 into memory 50, the code hits of the word from elevation memory 55 and input unit 56 are entered into the main memory word with all the code hits therein shifted by one column. As a result, at a time $t_{K1}$ when the same main memory word is read out, the code hit 0 for the range bin at azimuth position $Z_K$ and elevation $E_1$ is received is as diagrammed in FIG. 8 to which reference is made herein. The comparing circuits 60 and 61 through 65 are again supplied with code hits from three adjacent range bins. The output of circuit 60 is no longer significant since the determination to azimuth beam split about the center row has been previously determined. However, the comparisons performed by circuits 61 through 65 are significant since they are used to determine the column about which elevation beam splitting is to be performed.

Figure 8:
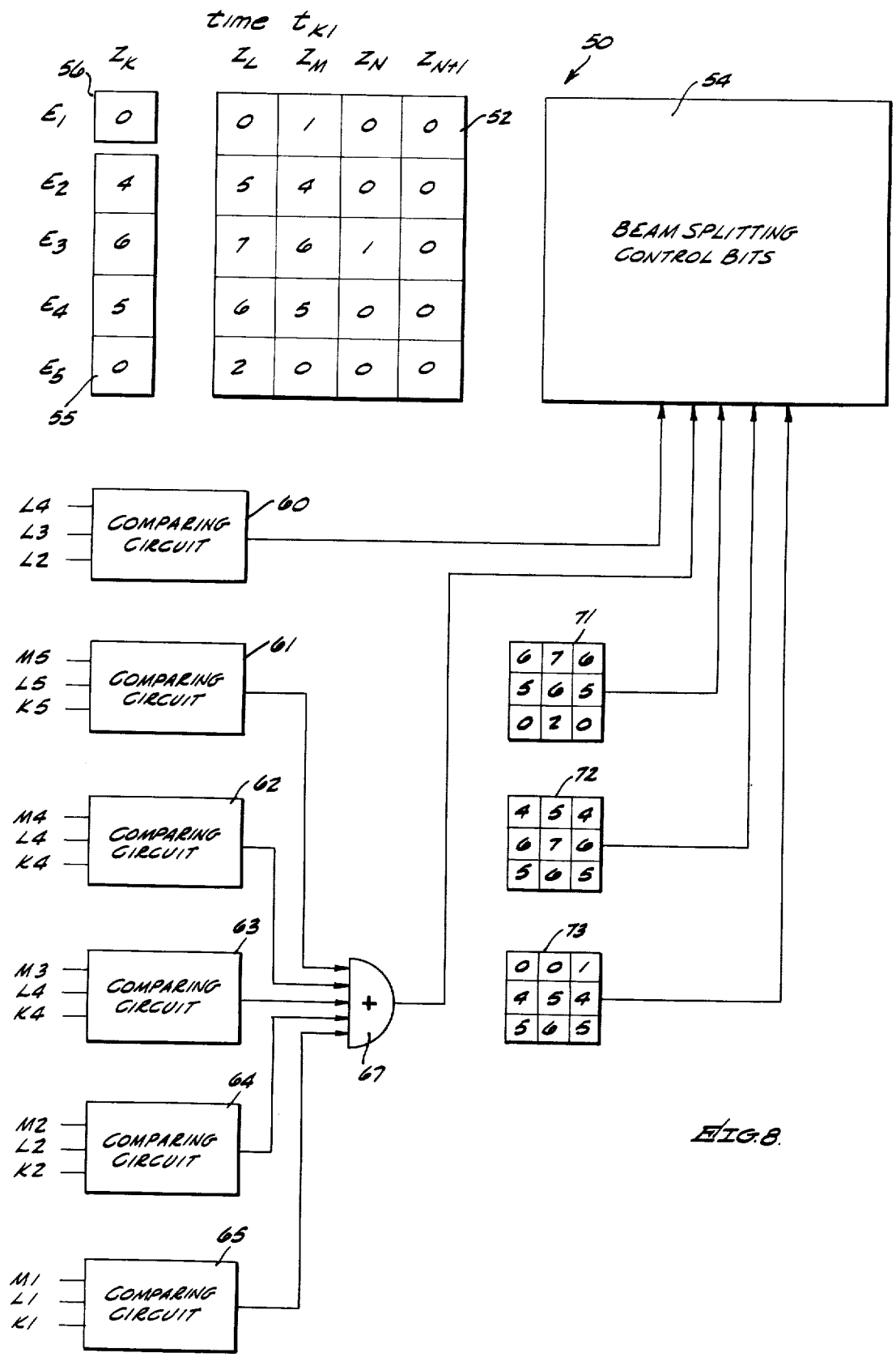

From the numerical values of the code hits read out from the elevation memory and the main memory as diagrammed in FIG. 8, it should be appreciated that each of circuits 61, 62, 63 and 64, will provide a true output to enable OR gate 67, since each one of these circuits is supplied with a hit code on the center input which is greater than the code hits on either one of its inputs. For example, the 2 code hit supplied to the center input of circuit 61 is greater than the 0 code hits supplied on either input M5 or K5.

Once OR gate 67 is enabled by any one of the comparing circuits, it sets a control bit, included in unit 54, to indicate that the code hits presently located in the column designated $Z_L$ are the ones to be used for elevation beam splitting. However, the actual beam splitting both in azimuth and elevation is delayed until a time when the code hits presently in the lefthand column of bits 52 are in the next column to the right as diagrammed in FIG. 9 to which reference is made herein.

This is necessary to insure that the center row, about which azimuth beam splitting is to be performed, contains code hits from two range bins on either side of the column about which elevation beam splitting is performed. In FIG. 9, the comparing circuits and the correlators are not shown, since once a determination is made about which column beam splitting should be performed, the function of the circuits and the correlator is no longer necessary. As seen from FIG. 9, the code hits necessary for azimuth and elevation beam splitting are all available coincidentally in time. These are then transferred to the processor 45 to process the code hits in accordance with the two subroutines hereinbefore outlined. The elevation beam splitting is performed by utilizing the code hits diagrammed in FIG. 9 under $Z_L$ while the azimuth beam splitting is performed by utilizing the code hits in the row, designated $E_3$.

It should be appreciated that the foregoing described embodiment of memory 40 requires a relatively large memory storage capacity. This is true because each word of the main memory must contain sufficient storage capacity for 20 code hits represented by bits 52 in FIG. 7, plus the azimuth and elevation beam splitting control bits 54. Also, 4,000 such words are required in the main memory. Furthermore, 400 words, each with a storage capacity of four code hits are required in the elevation memory 55. Thus, the described embodiment is mostly practical when storage capacity limitations are not of primary consideration.

However, in applications where storage capacity is limited, the foregoing described embodiment has to be modified. The required modifications however, must produce a memory system in which nine code hits forming the 3×3 matrix are available in time coincidence for 4,000 range bins at each azimuth position. Also, the system must be able to accumulate the target detection signals produced by adjacent range bins in the 5×5 matrix, such as that diagrammed in FIG. 6 for the beam splitting.

Such an implementation of memory 40 may be accomplished by an arrangement as diagrammed in FIG. 10. Therein, numerals 91, 92 and 93 represent a main memory, an elevation memory and a buffer memory, respectively, all included in memory 40. The main and elevation memories 91 and 92 are similar to the respective memories 50 and 55 (FIGS. 7 and 8), except that, whereas in memory 50 each of the 4,000 words contains bits for the storage of twenty 3 bit codes, in main memory 91 each word contains bits for storing six 3 bit codes. Similarly, each word of the 400 words in memory 92 consists of bits for storing two 3 bit codes rather than the four, stored in each of the words of elevation memory 55.

To explain how these memories operate reference is again made to FIG. 6. At time $t_{L3}$ when the 7 code hit from the range bin L3 (azimuth $Z_L$, elevation $E_3$) is received in real time, the word from memory 91 which contains the 3 bit codes 6, 5, 0, 1, 0 and 0 at azimuth position $Z_M$ and $Z_N$ at elevations $E_3$, $E_4$ and $E_5$, respectively is read out. At the same time, the word read out from elevation memory 92 contains the 3 bit codes 6 and 2 of range bins L4 and L5. Thus, the nine 3 bit codes forming the 3×3 matrix of range bins at the bottom righthand corner of the twenty-five 3 bit codes shown in FIG. 6, are available in time coincidence. Once available, they are correlated to determine whether the nine 3 bit codes form any of the patterns shown in FIG. 5. If they do, a target detection signal is produced. As will be explained hereafter in detail, each word in the main memory contains bits which define an azimuth hit counter, and two azimuth action bits hereafter designated AA1 and AA2. Similarly each word in the elevation memory includes bits defining an elevation hit counter and two elevation action bits AE1 and AE2. The counters are incremented for each target detection signal and reset when such a signal is not produced. On the other hand, the control bits are set depending on the relative amplitudes of the code hits in adjacent range bins. In addition each of the words includes added bits into which other information may be entered, such as an address in a related buffer memory.

For the generalized 3 × 3 code hit matrix shown in FIG. 4 in window 35, the logic for setting the action bits may best be expressed by the following equations:

Set  $AA1 = (B_2 < A_2 + B_2 < C_2)$ TD
Set  $AA2 = (B_2 > A_2) (B_2 > C_2)$ TD + TD $(B_2 = A_2 + B_2 = C_2)$
Set  $AE1 = (B_2 < B_1 + B_2 < B_3)$ TD
Set  $AE2 = (B_2 > B_1) (B_2 > B_3)$ TD + TD $(B_2 = B_1 + B_2 = B_3)$.

In the above expressions TD represents a target detection signal. Relating these expressions to the nine code hits, $$\begin{matrix} 7 & 6 & 1 \\ 6 & 5 & 0 \\ 2 & 0 & 0, \end{matrix}$$

shown in the bottom right hand corner of FIG. 6 it is seen that one of the hit patterns shown in FIG. 5 is produced. Thus TD is true. Also, AA1 and AE1 are set.

In addition to the main and elevation memories 91 and 92 (FIG. 10) buffer memory 93 is included. Its function is to accumulate the various code hits, necessary for beam splitting. All three memories, as well as the video correlator 42 (FIG. 1) and video processor 45 are controlled by a control logic unit 100.

Figure 11:
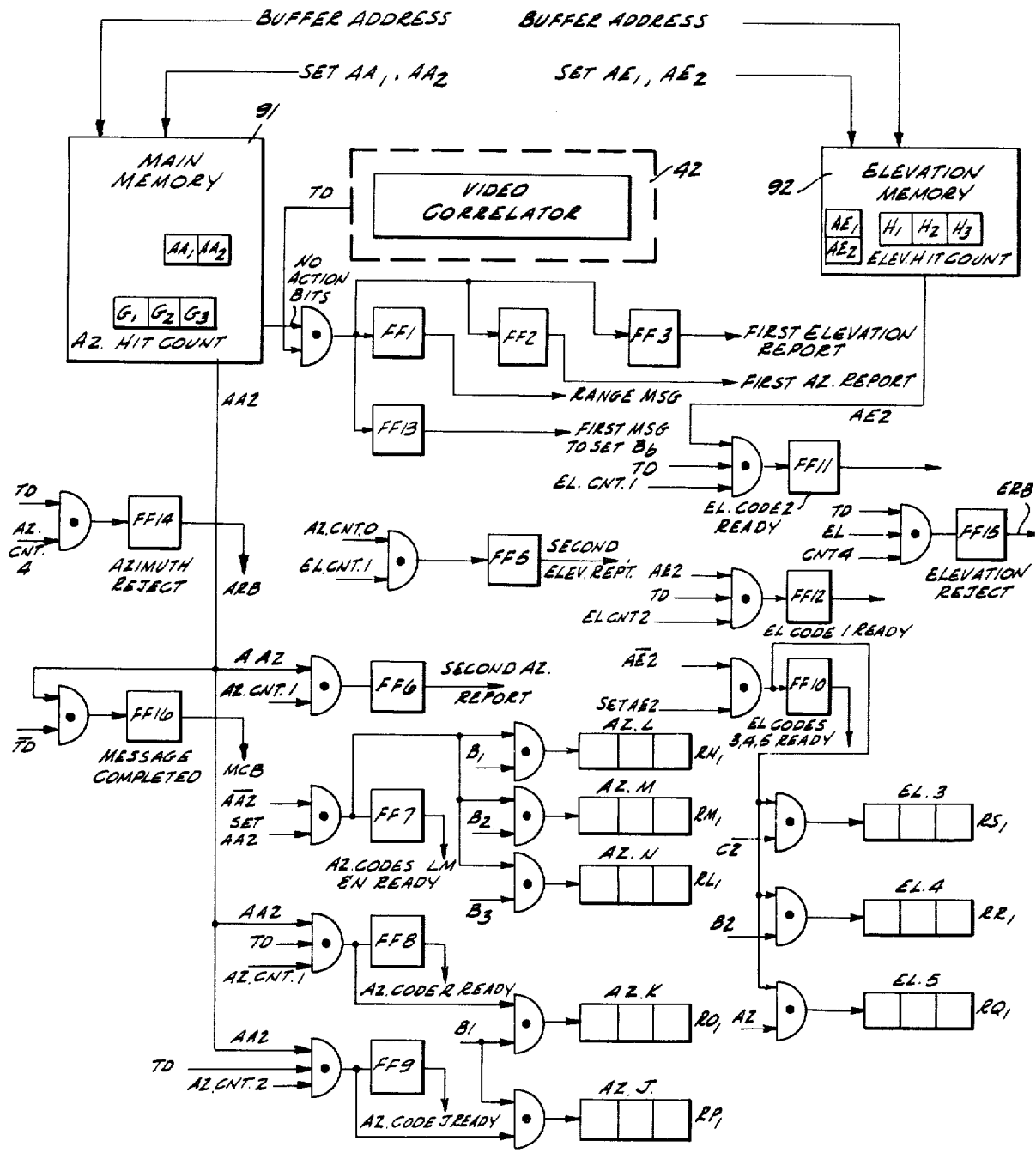

The control logic unit 100, shown in FIG. 10, is diagrammed to represent the circuitry necessary to control the operations of the various memories as well as video correlator 42 and processor 45. One of its basic features is to control the transferring of the various bits of data into the buffer memory 93 in which they are accumulated for subsequent processing. A partial block diagram of the various control flip-flop gates and registers of unit 100 are diagrammed in FIG. 11, wherein the main memory 91, the elevation memory 92 and correlator 42 are also shown. In FIG. 11 the azimuth hit counter in each word of memory 91 is represented by bits $G_1$, $G_2$ and $G_3$, while the elevation hit counter in each word of elevation memory 92 is represented by bits $H_1$, $H_2$ and $H_3$.

The format of the words in the elevation and main memories 92 and 91 are diagrammed in FIGS. 12 and 13, respectively. In each word of the elevation bits 1-6 are used to store two 3 bit codes of range bins $A_1$ and $B_1$ (see FIG. 4) of the moving window. Bits 7 and 8 are the elevation action bits AE1 and AE2 while bits 9, 10 and 11 comprise the three bit elevation hit counter. The rest of the bits (12-n) are extra bits, used for storing such information as an address in a buffer memory. In each word in the main memory bits 1-18 are used to store six 3 bit codes of range bins $C_2$, $B_2$, $A_2$, $C_3$, $B_3$ and $A_3$ (FIG. 4) of the moving window. Bits 19 and 20 are the azimuth action bits AA1 and AA2, bits 21, 22, and 23 form a three bit azimuth hit counter and bits 24-n are extra bits.

The operation of the various memories may best be explained by the following list of steps with respect to the code hits diagrammed in FIG. 6. The steps listed are with respect to the range bins at the center of the moving window or the 3×3 range bin matrix. Thus, for example, the first step is performed at time $t_{L3}$ when the 7 hit code of range bin L3 is received in real time.

| Azimuth | Elevation | Action |
|---|---|---|
| $Z_M$ | $E_5$ | No detection. Clear all action bits and hit counters. |
| $Z_M$ | $E_4$ | Detection. Set AA1. Set AE1. Increment the azimuth and elevation hit counters. Send the range word to the buffer controlled by FF1. Set $B_b$ buffer action bit controlled by FF13. Send azimuth and elevation words to buffer controlled by FF2 and FF3 (Note: The azimuth and elevation words correspond to beam position L3). Copy buffer address used into both memories. |
| $Z_M$ | $E_3$ | Detection. Set AA2. Set AE1. Increment the azimuth and elevation hit counters. Send the amplitude codes of beams N3, M3 and L3 to the buffer address used. This transfer as controlled by FF7 and registers $RL_1$, $RM_1$ and $RN_1$. Send the elevation word to the buffer address used (Note: The elevation word corresponds to beam position L2). This transfer is controlled by FF5. Copy buffer address used into main memory. |
| $Z_M$ | $E_2$ | Detection. Set AA1. Set AE1. Increment both hit counters. Copy buffer address used into main memory. |
| $Z_M$ | $E_1$ | No detection. Clear all action bits, hit counters and addresses. |
| $Z_L$ | $E_5$ | No detection. Clear all action bits, hit counters and addresses. |
| $Z_L$ | $E_4$ | Detection. Set AA1. Set AE2. Increment both hit counters. Send azimuth word controlled by FF13 and amplitude codes for beams L5, L4 and L3 as controlled by FF10, $RQ_1$, $RR_1$ and $RS_1$ to buffer address used. (Note: The azimuth word corresponds to position K3). Copy buffer address from main memory into the elevation memory. |
| $Z_L$ | $E_3$ | Detection. Set AA2. Set AE2. Send amplitude codes for positions K3 and L2 to buffer address used. This step is controlled by FF8, FF11 and registers $RO_1$ and $RT_1$. Increment both hit counters. |
| $Z_L$ | $E_2$ | Detection. Set AA1. Set AE2. Send amplitude code for position L1 to buffer address used. This step is controlled by FF12, and register $RU_1$. Increment both hit counters. |
| $Z_L$ | $E_1$ | No detection. Clear all action bits, hit counters and addresses. |
| $Z_K$ | $E_5$ | No detection. Clear all action bits, hit counters and addresses. |
| $Z_K$ | $E_4$ | Detection. Set AA1. Set AE1. Increment both hit counters. Copy buffer address from main memory into elevation memory. |
| $Z_K$ | $E_3$ | Detection. Set AA2. Set AE1. Increment both hit counters. Send amplitude code in position J-3 to buffer address used. This step is controlled by FF9 and register $RO_1$. |
| $Z_K$ | $E_2$ | Detection. Set AA1. Set AE1. Increment both hit counters. |
| $Z_K$ | $E_1$ | No detection. Clear all action bits, hit counters and addresses. |
| $Z_J$ | $E_5$ | No detection. Clear all action bits, hit counters and addresses. |
| $Z_J$ | $E_4$ | No detection. Clear all action bits, hit counters and addresses. |
| $Z_J$ | $E_3$ | No detection. Send message completed bit to the buffer address used. This is controlled by FF16. Clear all action bits, hit counters and addresses. |
| $Z_J$ | $E_2$ | No detection. Clear all action bits, hit counters and addresses. |

The buffer memory 93 also includes an azimuth reject bit ARB, a storage-location-in-use bit SL, an elevation reject bit ERB and a message completed bit MCB. The azimuth reject bit ARB is set by FF14 when any azimuth hit counter in a word in main memory 91 reaches a selected count, such as four (4). This count indicates that target detection occurred in too many (4) successive azimuth beam positions and therefore it should be assumed to be a result of clutter or noise rather than a valid target. Similarly, the elevation reject bit ERB is set by FF15 when the count in the elevation hit counter in elevation memory 92 reaches a selected count, such as four (4). These bits are used to prevent the system from producing beam splitting to indicate the location of a target if target detection is produced in too many adjacent range bins, which are more likely a result of clutter than a meaningful target.

The message or data stored in the specific location in buffer memory 93 is extracted when the message complete bit MCB is set by FF16 and the relationship MCB.ARB.ERB is true. If MCB is true and either of the other two bits is true, the message is cleared from the buffer and discarded, since it is more likely a result of clutter. The buffer memory is periodically searched during radar dead time to select a completed message, which is to be operated upon by processor 45. The operation is in accordance with the subroutines previously outlined for both azimuth and elevation beam splitting.

It should be apparent that the need for the buffer memory 93 (FIG. 10) and the control logic unit 100 only exists if the memories 91 and 92 are of limited storage capacity. In such a case the buffer memory 93 is required in order to accumulate the various hit codes, used for the beam splitting. Also a need exists to transfer the address in the buffer in which the code hits are accumulated to various words in the main and elevation memories in order to insure that code hits subsequently read out from these words are stored in the proper location in the buffer.

It should further be appreciated that if each word in the main memory were to store more than six code hits and each word in the elevation memory were to store more than two code hits, different control logic would be required. Thus, the function of the main memory 91 (FIG. 10) is to store and provide code hits in real time from a reduced (3×3) pattern of range bins for correlation in correlator 42 (FIG. 10). On the other hand the function of buffer memory 93 is to accumulate selected code hits from range bins of an enlarged pattern (5×5) for beam splitting as a function of target detection signals provided by correlator 42. Control logic unit 100 controls the storage of code hits and other signals necessary for code hit accumulation in the three memories 91, 92 and 93. Then when all the code hits are accumulated, i.e. the message is completed, the accumulated code hits are transferred from the buffer memory 93 to the processor 45. Therein they are processed in accordance with the subroutines, previously outlined.

The functions of the various control flip-flops and registers shown in FIG. 11, in controlling the various data portions transferred to the memories and in particular the buffer memory 93, may best be summarized by the following list:

LIST 1

FF1 indicates a range message to the buffer.
FF2 indicates the first azimuth report.
FF3 indicates the first elevation report.
FF5 indicates the second elevation report.
FF6 indicates the second azimuth report.
FF7 indicates the azimuth amplitude code reports in azimuth positions N, M and L.
FF8 indicates the azimuth amplitude code reports in azimuth position K.
FF9 indicates the azimuth amplitude code reports in azimuth position J.
FF10 indicates the elevation amplitude code reports in elevation positions 5, 4 and 3.
FF11 indicates the elevation amplitude code report in elevation position 2.
FF12 indicates the elevation amplitude code report in elevation position 1.
FF13 indicates this is the first message so the buffer action bit $B_b$ can be set.
FF14 indicates the azimuth reject bit so the buffer action bit ARB can be set.
FF15 indicates the elevation reject bit so the buffer action bit ERB can be set.
FF16 indicates message completed bit so the buffer action bit MCB can be set.
TD a logic gate indicates detection.
$G_1$ — MSD of azimuth hit counter.
$G_2$ — 2nd MSD of azimuth hit counter.
$G_3$ — LSD of azimuth hit counter.
$H_1$ — MSD of elevation hit counter.
$H_2$ — 2nd MSD of elevation hit counter.
$H_3$ — LSD of elevation hit counter.
$A_1$ — The 3 bit amplitude code in bottom row and left column of the moving window. (See FIG. 4)
$A_2$ — The 3 bit amplitude code in bottom row and middle column of the moving window.
$A_3$ — The 3 bit amplitude code in bottom row and right column of the moving window.
$B_1$ — The 3 bit amplitude code in the middle row and left column of moving window.
$B_2$ — The 3 bit amplitude in the middle row and middle column of the moving window.
$B_3$ — The 3 bit amplitude in the middle row and right column of moving window.
$C_1$ — The 3 bit amplitude code in the top row and left column of moving window.
$C_2$ — bit amplitude code in the top row and middle column of the moving window.
$C_3$ — The 3 bit amplitude code in the top row and right column of moving window.

Readout Registers for Data $RL_1$ — A 3 bit register for outputing amplitude codes.
$RM_1$ — A 3 bit register for outputing amplitude codes.
$RN_1$ — A 3 bit register for outputing amplitude codes.
$RO_1$ — A 3 bit register for outputing amplitude codes.
$RP_1$ — A 3 bit register for outputing amplitude codes.
$RQ_1$ — A 3 bit register for outputing amplitude codes.

$RR_1$ — A 3 bit register for outputing amplitude codes.

$RS_1$ — A 3 bit register for outputing amplitude codes.

$RT_1$ — A 3 bit register for outputing amplitude codes.

$RU_1$ — A 3 bit register for outputing amplitude codes.

$X > Y$ — The amplitude of the three bit code in beam X is greater than beam Y. $X_1 = $ LSD, $X_2 = $ 2nd LSD, $X_3 = $ MSD. The amplitude of the code in position $B_2$ is compared to $A_2$, $B_1$, $B_3$ and $C_2$ at each range bin interval by a gate with logic described by $X > Y$ and $Y > X$.

The operation of the various flip-flops, the AND gates, designated by the conventional $\cdot$ , and the OR gate, designated by $+$, are best expressed by the following logic equations:

LIST 2

SET FF1 = TD $[\overline{AA_1} \ \overline{AA_2} \ \overline{AE_1} \ \overline{AE_2}]$
RESET FF1 = $\overline{SET \ FF1}$
SET FF2 = $\overline{SET \ FF1}$
RESET FF2 = $\overline{SET \ FF1}$
SET FF3 = SET FF1
RESET FF3 = SET FF3
SET FF5 = $\overline{G_1} \ \overline{G_2} \ \overline{G_3} \ \overline{H_1} \ \overline{H_3} \ H_3$
RESET FF5 = $\overline{SET \ FF4}$
SET FF6 = $AA_2 \ \overline{G_1} \ \overline{G_2} \ G_3$
RESET FF6 = $\overline{SET \ FF6}$
SET FF7 = $\overline{AA_2}$ SET $AA_2$
RESET FF7 = $\overline{SET \ FF7}$
SET FF8 = $AA_2 \ \overline{G_1} \ \overline{G_2} \ G_3$ D
RESET FF8 = $\overline{SET \ FF8}$
SET FF9 = $AA_2 \ \overline{G_1} \ \overline{G_2} \ G_3$ TD
RESET FF9 = $\overline{SET \ FF9}$
SET FF10 = $\overline{AE2}$ SET $AE_2$
RESET FF10 = $\overline{SET \ FF10}$ SET FF11 = $AE_2 \ \overline{H_1} \ \overline{H_2} \ H_3$ TD
RESET FF11 = $\overline{SET \ FF11}$
SET FF12 = $AE_3 \ \overline{H_1} \ H_2 \ \overline{H_3}$ TD
RESET FF12 = $\overline{SET \ FF12}$
SET FF13 = $\overline{SET \ FF1}$
RESET FF13 = $\overline{SET \ FF1}$
SET FF14 = TD $[G_1 \ \overline{G_2} \ \overline{G_3}]$
RESET FF14 = $\overline{SET \ FF14}$
SET FF15 = TD $H_1 \ \overline{H_2} \ \overline{H_3}$
RESET FF15 = $\overline{SET \ FF15}$
SET FF16 = $\overline{TD} \ AA_2$
RESET FF16 = $\overline{SET \ FF16}$
SET $G_1$ = TD $[\overline{G_1} \ G_2 \ G_3 + G_1]$
RESET $G_1$ = $\overline{SET \ G_1}$
SET $G_2$ = TD $[G_2 \ G_3 + G_1 \ G_2]$
RESET $G_2$ = $\overline{SET \ G_2}$
SET $G_3$ = TD $[G_3 + G_1 \ G_2 \ G_3]$
RESET $G_3$ = SET $G_3$
SET $H_1$ = TD $[\overline{H_1} \ H_2 \ H_3 + H_1]$
RESET $H_1$ = $\overline{SET \ H_1}$
SET $H_2$ = TD $[\overline{H_2} \ H_3 + H_1 \ H_2]$
RESET $H_2$ = $\overline{SET \ H_2}$
SET $H_3$ = TD $[\overline{H_3} + H_1 \ H_2 \ H_3]$
RESET $H_3$ = $\overline{SET \ H_3}$
$X > Y = X_3 \ \overline{Y_3} + X_2 \ \overline{Y_2} \ (\overline{X_3 \ Y_3}) + X_1 \ \overline{Y_1} \ (\overline{X_3 \ Y_3}) \ (\overline{X_2 \ Y_2})$
$Y > X = \overline{X_3} \ Y_3 + \overline{X_2} \ Y_2 \ (\overline{X_3 \ Y_3}) + \overline{X_1} \ Y_1 \ (\overline{X_3 \ Y_3}) \ (\overline{X_2 \ Y_2})$
$(\overline{X > Y}) \ (\overline{Y > X}) = > X = Y$
SET $RL_1$ = SET FF7
RESET $RL_1$ = $\overline{SET \ FF7}$
SET $RM_1$ = SET FF7
RESET $RM_1$ = $\overline{SET \ FF7}$
SET $RN_1$ = SET FF7
RESET $RN_1$ = $\overline{SET \ FF7}$
SET $RO_1$ = SET FF8 + SET FF11
RESET $RO_1$ = $\overline{SET \ FF8}$
SET $RP_1$ = SET FF9 + SET FF12
RESET $RP_1$ = $\overline{SET \ FF9}$
SET $RQ_1$ = SET FF10 RESET $RQ_1$ = SET FF10
SET $RR_1$ = SET FF10
RESET $RR_1$ = $\overline{SET \ FF10}$
SET $RS_1$ = SET FF10
RESET $RS_1$ = $\overline{SET \ FF10}$
SET $RT_1$ = SET FF11
RESET $RT_1$ = $\overline{SET \ FF11}$
SET $RU_1$ = SET FF12
RESET $RU_1$ = $\overline{SET \ FF12}$
SET MAIN ADDRESS = SET FF1
COPY ELEVATION ADDRESS INTO MAIN ADDRESS = TD $(AE_1 + AE_2)$
RESET MAIN ADDRESS = $\overline{TD}$
SET ELEVATION ADDRESS = SET FF1
COPY MAIN ADDRESS INTO ELEVATION MEMORY = TD $(AA_1 + AA_2)$
RESET ELEVATION ADDRESS = $\overline{TD}$ It should be pointed out that in FIG. 11, the various AND and OR gates are not numbered in order to simplify the description.

The foregoing described embodiments of the invention may be summarized as a system for automatically beam splitting quantized video returns from range sweeps in a radar scan pattern moving in azimuth with a plurality of elevations at each azimuth position. The quantized video returns or hit codes in adjacent range bins for each range interval are stored in words in two memories (main and elevation). These hit codes together with the hit code received in real time are correlated to provide a target detection signal when the hit codes form any one of a plurality of hit patterns (FIG. 4). Also the amplitudes of the code hits are compared to select the row and column of hit codes to be used for azimuth and elevation beam splitting.

In the foregoing example, diagrammed in FIG. 6, the selected row and column of the processed code hits are $E_3$ and $Z_L$ respectively. They are processed in accordance with the fixed subroutines, previously outlined. Also, $\Delta AZ$ and $\Delta EL$ terms are derived by utilizing the azimuth and elevation position of the antenna for the first two target detections in different elevation positions. It has been found that such an azimuth and elevation beam splitting system increases the target position accuracy by 8 and 10 to 1 over the entire dynamic range. Such increased accuracy has been confirmed by simulating the processing operation with a general purpose computer.

The different embodiments of data storing and processing techniques have been disclosed. However, it should be appreciated that the basic principles of the invention may be implemented by those familiar with the art by employing circuit arrangements which differs from the specific arrangements, herebefore described. Therefore all such modifications and/or equivalents are deemed to fall within the scope of the invention as defined in the appended claims.

I claim:

1. A radar video processing system comprising:
   first means responsive to signals received from range bins, defining range intervals, for providing a hit code for each range bin, the hit code being a function of the video returns from the range bin;

second means for storing the hit codes from a selected number of range bins related in azimuth and elevation; and third means responsive to the hit codes in said second means for operating on said hit codes to determine the position of a target as a function of the hit code amplitudes and patterns of hit codes in selected adjacent range bins, said third means including comparing means for comparing the amplitudes of said code hits to select a predetermined number of code hits adjacent in at least one direction to determine the position of a target along said direction.

2. The system as recited in claim 1 wherein said third means includes comparing means for determining the relative amplitudes of code hits in range bins adjacent in azimuth and elevation, and processing means for processing a first selected group of code hits from range bins in adjacent azimuth positions and the same elevation to derive a target azimuth position and for processing a second selected group of code hits from range bins in the same azimuth position but adjacent elevations to derive a target elevation position.

3. The system as recited in claim 2 wherein said third means further includes correlating means for correlating the code hits from a preselected pattern of adjacent range bins to provide a target detection signal when the amplitudes of the code hits in said pattern correspond to any one of a group of acceptable hit patterns, said third means further including means responsive to said target detection signals for utilization in the derivation of said target azimuth and elevation position.

4. The system as recited in claim 3 further including counting means responsive to said target detection signals for providing process inhibiting signals when said correlating means provides a predetermined number of successive target detection signals.

5. A radar video processing system of the type receiving a succession of multibit numerical codes, each code number being a function of the peak of video returns from a different range-interval-defining range bin provided in response to radar pulses transmitted sequentially in elevation at several elevation positions at each of a sequence of azimuth positions, to provide target position signals, the system comprising:

first means for successively receiving said numerical codes and for storing at selected locations therein codes from adjacent range bins for each range interval; and second means for relating the codes in selected ones of said adjacent range bins to derive target position signals as a function of the actual numbers of selected ones of said codes.

6. The radar video processing system as recited in claim 5 further including means for correlating code numbers to provide target detection signals when the code numbers in selected range bin patterns are at least equal to predetermined values, said second means including means responsive to said target detection signals to provide said target position signals as a function thereof.

7. The radar video processing system as recited in claim 6 wherein said correlating means include means for correlating codes in a $n \times n$ range bin pattern to provide a target detection signal for the center range bin when the code of center range bin and the code of at least one adjacent range bin are at least equal to said predetermined values, said second means further including means for storing selected ones of codes of range bin patterns providing said target detection signals and further including means for processing said selected codes to provide said target position signal.

8. The radar video processing system as recited in claim 7 wherein said means for storing in said second means store up to $r$ codes from $r$ adjacent range bins in the same elevation and up to $r$ codes from $r$ adjacent range bins in the same azimuth, where $r$ is greater than $n$.

9. The radar video processing system as recited in claim 8 wherein $n=3$ and $r=5$.

10. The radar video processing system as recited in claim 5 wherein said second means includes means relating the codes in range bins defining a $n \times n$ pattern for providing a target detection signal when the numerical value of the code of the center range bin and the code of at least one other range bin are equal or greater than preselected values and second means including storing and processing means responsive to the target detection signals for storing and processing the codes of up to $r$ selected range bins which are adjacent in azimuth at the same elevation to provide an azimuth target position signal and for storing and processing the codes of up to $r$ selected range bins which are adjacent in elevations at the same azimuth to provide an elevation target position signal.

11. The radar video processing system as recited in claim 10 wherein said first means include two memories for storing the codes of adjacent range bins, and said second means includes a buffer memory for storing the codes of up to $r$ selected range bins which are adjacent in azimuth at the same elevation and the codes of up to $r$ selected range bins which are adjacent in elevation at the same azimuth.

12. A radar video processing system for processing returns from radar pulses transmitted sequentially at several elevations at each of a plurality of sequential azimuth positions comprising:

means for quantizing the video returns from each range bin into a code;

means for storing the codes of range bins related in azimuth and elevation;

means for correlating said codes to determine the relative values of said codes and patterns formed thereby; and means responsive to the means for correlating for processing codes from range bins in a selected azimuth position and a selected elevation to provide signals indicative of a target's elevation and azimuth respectively.

13. The radar video processing system as recited in claim 12 wherein each code is a multibit code whose numerical value is a function of the peak of the video returns from the range bin, and means responsive to said correlating means for providing a target detection signal when the codes in any one of a preselected group of patterns are of at least predetermined numerical values.

14. A radar video processing system of the type receiving signals from each of a plurality of range-interval-defining range bins in a direction in which a radar pulse is transmitted, the pulses being transmitted sequentially at several elevations at each of a plurality of sequential azimuth positions, the system comprising:

first means receiving signals from each range bin to develop for the range bin a multibit code whose numerical value is a function of the peak amplitude of the received signals;

memory means for receiving said multibit codes and for storing the codes of range bin adjacent in elevation and azimuth in discrete locations therein;

code-correlating means for correlating the codes of a predetermined number of adjacent range bins to provide target detection signals when the numerical values of the correlated codes are at least equal to preselected values and are arranged in any one of predetermined patterns; and azimuth and elevation processing means responsive to said target detection signals and to the relative numerical values of the codes from adjacent range bins for providing a target azimuth signal as a function of the numerical values of codes from a preselected number of adjacent range bins in adjacent azimuth positions at the same elevation and a target elevation signal as a function of the numerical values of codes from a preselected number of adjacent range bins in adjacent elevations at the same azimuth.

* * * * *

UNITED STATES PATENT OFFICE
CERTIFICATE OF CORRECTION

PATENT NO. : 3,919,707
DATED : November 11, 1975
INVENTOR(S) : Norol T. Evans

It is certified that error appears in the above-identified patent and that said Letters Patent are hereby corrected as shown below:

Col. 7, line 67, delete "Yes,".
Col. 8, line 19, "3≥4" should be --3>4--;
       line 23, after "completion" delete "1";
       line 43, after "go to" insert --step 2--;
       line 47, after "zero" delete "Yes".
Col. 15, line 22, "MCB.ARB.ERB" should be --MCB·$\overline{ARB}$·$\overline{ERB}$--.
Col. 17, line 21, should be --SET FF2 = SET FF1--;
       line 24, should be --RESET FF3 = $\overline{\text{SET FF3}}$--;
       line 41, should be --SET FF13 = SET FF1--;
       line 54, should be --RESET $G_3$ = $\overline{\text{SET } G_3}$--;
       line 63, should be
$$--Y>X = \overline{X}_3 Y_3 + \overline{X}_2 Y_2 (\overline{X_3 \overline{Y}_3}) + \overline{X}_1 Y_1 (\overline{X_3 \overline{Y}_3})(\overline{X_2 \overline{Y}_2})--.$$
Col. 18, line 8, should be --SET $RQ_1$ = SET FF10 RESET $RQ_1$ = $\overline{\text{SET FF10}}$--.

Signed and Sealed this twenty-fifth Day of May 1976

[SEAL]

Attest:

RUTH C. MASON
*Attesting Officer*

C. MARSHALL DANN
*Commissioner of Patents and Trademarks*